United States Patent
Schlüter

(10) Patent No.: US 7,193,705 B2
(45) Date of Patent: Mar. 20, 2007

(54) METHOD FOR DETERMINING ATOMIC ISOTOPE MASSES

(75) Inventor: Hans-Jürgen Schlüter, Bremen (DE)

(73) Assignee: Thermo Electron (Bremen) GmbH (DE)

( * ) Notice: Subject to any disclaimer, the term of this patent is extended or adjusted under 35 U.S.C. 154(b) by 51 days.

(21) Appl. No.: 10/936,413

(22) Filed: Sep. 8, 2004

(65) Prior Publication Data

US 2005/0061965 A1  Mar. 24, 2005

(30) Foreign Application Priority Data

Sep. 23, 2003  (DE)  ................................ 103 44 239

(51) Int. Cl.
 *G01J 3/30*  (2006.01)
 *G01N 33/00* (2006.01)
(52) U.S. Cl. ...................... 356/311; 356/308; 356/315; 436/35; 436/56; 436/133; 436/172
(58) Field of Classification Search ................ 250/282, 250/281; 360/97.02, 97.03, 235.8, 236.5; 356/311, 308, 315; 436/35, 56, 133
See application file for complete search history.

(56) References Cited

U.S. PATENT DOCUMENTS

| 3,786,249 | A | * | 1/1974 | Anbar et al. | ................. 250/283 |
| 4,734,579 | A | * | 3/1988 | Lucatorto et al. | ........... 250/282 |
| 5,545,894 | A | * | 8/1996 | Funsten et al. | ............. 250/281 |

* cited by examiner

*Primary Examiner*—Nikita Wells
*Assistant Examiner*—Johnnie L Smith, II
(74) *Attorney, Agent, or Firm*—Laurence P. Colton; Powell Goldstein LLP

(57) ABSTRACT

A method for determining atomic isotope masses in mass spectrometry, atomic isotope ratios being determined from molecular isotope ratios measured by means of an isotope mass spectrometer—ion correction, the determination of the atomic ratios being carried out by setting up and solving a system of equations which describes relationships between the atomic and the molecular ratios, and the system of equations having to have at least as many independent equations as there are atomic ratios. The entire system of equations is linearized by means of suitable numerical methods in a first step, in particular by means of a Taylor expansion or similar method, and in which the linearized system of equations is subsequently solved as a whole without transforming the individual equations.

23 Claims, No Drawings

US 7,193,705 B2

METHOD FOR DETERMINING ATOMIC ISOTOPE MASSES

STATEMENT OF RELATED APPLICATIONS

This application claims foreign priority benefits under 35 USC 119(a)–(d) or (f), or 365(b) on German patent application number 10344239.1, filed on 23 Sep. 2003.

BACKGROUND OF THE INVENTION

1. Technical Field

The invention relates to a method for determining atomic isotope masses in mass spectrometry, atomic isotope ratios being determined from molecular isotope ratios measured by means of an isotope mass spectrometer—ion correction, the determination of the atomic ratios being carried out by setting up and solving a system of equations which describes relationships between the atomic and the molecular ratios, and the system of equations having to have at least as many independent equations as there are atomic ratios.

2. Prior Art

In gas isotope mass spectrometry, gas molecules which are composed of a plurality of different atoms are measured in most cases. In this case, the ratios between various molecular isotope masses are measured. Atomic isotope ratios are mentioned when the mass ratios of two isotopes of a specific atom are to be designated. On the other hand, molecular isotopolog ratios are mentioned when the mass ratios of specific isotopologs at the molecular level are designated.

The determination of molecular isotopolog ratios is usually less desired than the determination of atomic isotope ratios.

In order to determine the atomic ratios from the molecular isotopolog ratios, it is known to set up various equations which describe theoretical and empirical relationships between the respective ratios. These equations are then solved individually and in a complicated manner for the atomic ratios sought and under certain circumstances each individual equation is solved numerically. If, during a further isotope mass measurement, other atoms or molecules play a part, new equations have to be set up and these in turn have to be solved individually. These steps have to be carried out independently for each type of gas which is measured or is to be measured.

BRIEF SUMMARY OF THE INVENTION

It is therefore an object of the present invention to specify a method in which at least one drawback of the prior art is avoided, the intention being in particular for a flexible possible determination, less susceptible to error, of the atomic isotope ratio to be possible.

This object is achieved by a method of the type mentioned at the beginning in which the entire system of equations is linearized by means of suitable numerical methods in a first step, in particular by means of a Taylor expansion or similar method, and in which the linearized system of equations is subsequently solved as a whole without transforming the individual equations.

The method according to the invention can advantageously be applied to all gases, the addition of further ratios being simply possible.

In a further refinement of the invention, in order to standardize the measurements, molecular ratios are determined from standard values of atomic ratios—inverse ion correction, the same linearized system of equations being used both for the inverse ion correction and for the ion correction.

The invention is also directed to an apparatus for determining atomic isotope masses in a mass spectrometer, in particular a computer, having an input interface, a computing unit and an output interface, it being possible for data about molecular isotope ratios which can be measured by means of an isotope mass spectrometer to be transmitted to the computer unit via the input interface, it being possible for atomic isotope ratios to be determined from the data about molecular isotope ratios in accordance with a method described in the present invention, and it being possible for the atomic isotope ratios to be output via the output interface.

Finally, the invention is directed to a computer program for determining atomic isotope masses in mass spectrometry, one of the methods described in the present application being implemented in a program by means of a suitable programming language.

Further features of the present invention emerge from the appended claims and the following description of a practical exemplary embodiment

DETAILED DESCRIPTION OF THE PREFERRED EMBODIMENTS

In order to explain the method according to the invention, in the following text, by using the example of $CO_2$, the method used hitherto in the prior art will be compared with the method according to the invention. In this case, under I, first of all general relationships of the method of the prior art will be explained, under II the new method according to the invention will be presented, and under III exemplary calculations will be carried out by using practical data.

I. General Relationships of the Conventional Method

In gas isotope mass spectrometry, measurements are often made on gas molecules which are composed of a number of different atoms. In each case, the ratios between different masses are measured on a molecular basis. However, the atomic isotope ratios are relevant to the end results and also the international standard and reference substances.

1. Ion Correction

In the measurement of $CO_2$, for example, the ratios of the intensities of the mass 45 to the intensity of the mass 44 (R45) and of the intensities of the mass 46 to the intensity of the mass 44 (R46) are determined.

However, these molecular ratios are composed of the atomic ratios sought:

$R13 \hat{=} ((\text{amount of } ^{13}C) \text{ divided by } (\text{amount of } ^{12}C))$, $R17 \hat{=} ((\text{amount of } ^{17}O) \text{ divided by } (\text{amount of } ^{16}O))$ and $R18 \hat{=} ((\text{amount of } ^{18}O) \text{ divided by } (\text{amount of } ^{16}O))$.

In specific terms:
the mass 44 consists only of $^{12}C^{16}O_2$,
the mass 45 of $^{12}C^{16}O^{17}O$, $^{13}C^{16}O_2$, and $^{12}C^{16}O^{17}O$,
the mass 46 of $^{12}C^{16}O^{18}O$, $^{13}C^{17}O^{16}O$ and $^{12}C^{17}O_2$.

The masses 47 and 48 can likewise be composed of atomic ratios. The total frequency is, however, low, so that these masses are generally not measured.

It is easy to derive, and known from the literature, that:

$R45 = R13 + 2*R17$ $R46 = 2*R18 + 2*R13*R17 + R17^2$

In order to obtain the R13 and R18 sought (in rare cases also R17) from the known R45 and R46, information is obviously missing here. One remedy is provided by the following relationship being applied $$R17 = K * R18^\lambda$$

This equation cannot be derived exactly but is at best semi-empirical. There is generally disagreement about the factors K and $\lambda$. K can also be calculated from the R18 and R17 of the international standard in accordance with $$K = \frac{R17_{Standard}}{R18_{Standard}^\lambda}$$

However, R17 of the international standard is likewise not very accurately determined. In any case, the parameters are uncertain; the generally accepted parameters will probably still be revised frequently in the future.

These equations are they were transformed manually to form the equation $$0 = -3K^2 (R18)^{2\lambda} + 2K\, R45\, R18^\lambda + 2\, R18 - R46$$

with only one unknown; this is solved numerically, for example in accordance with a Newton-Raphson algorithm; this gives R18 and then R13 in accordance with $$R13 = R45 - 2K\, R18^\lambda$$

For other parameters of the semi-empirical equation, the result is possibly completely different final formulae to be solved, for example for $\lambda = 0.5$ $$R18 = 0.5 * (R46 - 2\, R17\, R13 - R17^2)$$

2. Inverse Ion Correction

For the standardization, the first step in the data evaluation, it is necessary to convert the known or defined atomic ratios into the molecular ratios (inverse ion correction). This is carried out by insertion into the above system of equations, which means that different equations are used for ion correction and inverse ion correction. The disadvantage in this case, apart from the susceptibility of this procedure to error, is that possible changes, for example the introduction of further gases (see above), bring with them changes in both systems of equations.

3. Other Gases

For each gas, the above relationships must be and are derived separately and in a complicated manner. The disadvantage in the existing method is, in particular, the fact that for each type of gas the derivation of the final formula must be carried out independently, which is time-consuming and susceptible to error.

The method is also inflexible for one and the same gas, since any (parameter) changes in the initial equations must be made directly in the software source code in the case of a software implementation of the method. Furthermore, for the inverse ion correction, it is necessary to use a different system of equations from that of the ion correction, which is likewise time-consuming and susceptible to error.

II. New Method

1. General Approach

With the general gas $$A^1_{n1} A^2_{n2} A^3_{n3} A^4_{n4} \ldots$$

where the $A^i$ are the individual elements, with i as a natural number ($i \in \mathbb{IN}$), $n_i$ ($i = 0, 1, 2, 3 \ldots$ or $i \in \mathbb{IN}\, 0$,) the chemical stoichiometric numbers, and $m^i$ ($i \in \mathbb{IN}$) the mass of the lightest isotope of the element $A^i$, it is true that:

$$0 = \sum_{i=1}^{i\max} n_i R(m^i + 1) - R\left(1 + \sum_{i=1}^{i\max} n_i m^i\right)$$

$$0 = \sum_{i=1}^{i\max} n_i R(m^i + 2) + \sum_{i=1}^{i\max} n_i R(m^i + 1) \sum_{j=1}^{i\max} nj R(m^j + 1) +$$

$$\sum_{i=1}^{i\max} Pos(n_i - 1) R(m^i + 1)^2 - R\left(2 + \sum_{i=1}^{i\max} n_i m^i\right)$$

$$0 = \sum_{i=1}^{i\max} n_i R(m^i + 3) + \sum_{i=1}^{i\max} n_i R(m^i + 2) \sum_{j=1}^{i\max} nj R(m^j + 1) +$$

$$\sum_{i=1}^{i\max} n_i R(m^i + 1) \left(\sum_{j=i}^{i\max} nj R(m^j + 1) \sum_{k=j}^{i\max} nj R(m^j + 1)\right) +$$

$$\sum_{i=1}^{i\max} Pos(n_i - 1) R(m^i + 1)^2 \sum_{j=1}^{i\max} n_j R(m^j + 1) +$$

$$\sum_{i=1}^{i\max} Pos(n_i - 2) R(m^i + 1)^3 - R\left(3 + \sum_{i=1}^{i\max} n_i m^i\right) \text{etc} \ldots$$

In this case, R(x) are the ratios of the mass x (atomic or molecular) divided by the mass of the main isotope.

The function Pos(x) is defined as $Pos(x) = 1$ for $x > 0$ $0$ for $x \leq 0$

The system of equations is simpler for real cases than it appears, since most terms are either 0 or are so small that they may be disregarded without any loss of accuracy (example: one constituent of carbon is always 14 C, but only in frequencies of 1e−10 of the main isotope, and can therefore be set equal to 0 without any loss of accuracy).

It is also entirely possible that, of the possible molecular masses or ratios, in spite of an adequate abundance (frequency), only a selection can be measured for metrological reasons.

In the general case, the system of equations is underdefined, possibly on account of the above restrictions, and is further supplemented with one or more equations of the form $$0 = f [R(m^i + n),\, R(m^i + m),\, R(m^i + k)]$$

where f can be any desired, general functional rule.

It is critical that the number of atomic ratios used in the system of equations must be at least as large as the number of independent equations.

Each of the equations of the system of equations must, furthermore, be continuous and capable of continuous differentiation This system of equations can also be represented in a simplified manner in vector notation as $$F(\overline{R_{mol}}, \overline{R_{at}}) = 0$$

In accordance with the new method, this system of equations is now no longer transformed individually (that is to say newly each time for each type of gas, measured masses, etc,) into an equation to be solved numerically but is solved as a whole. This can be done by various methods.

Preference is given to a Newton or pseudo Newton method, for example Newton-Kantorowitsch. In this case, the effort on computation is quite low because of the fast iteration, and therefore the speed of the calculations is high.

Alternative methods are, for example, gradient methods or fixed point iterations.

2. Ion Correction

For the ion correction, the molecular ratios are known from the measurement.

$$F(\overrightarrow{R_{mol}}, \overrightarrow{R_{at,}})$$

must therefore be sold for the atomic ratios. The first step consists in the linearisation of the general nonlinear system equations with the effect of a Taylor expansion around an initial vector $R_{at}^0$ $$F(\overrightarrow{R_{mol}}, \overrightarrow{R_{at,}}) \approx \frac{dF}{d\overrightarrow{R_{at,}}} * (\overrightarrow{R_{at,}} - \overrightarrow{R_{at}^0}) + F(\overrightarrow{R_{mol}}, \overrightarrow{R_{at}^0})$$

The initial vector is ideally but, because of the fast convergence of this method, not necessarily, close to the actual ratios. This can be expediently be achieved by the known elementary ratios of the standard being used as a starting point.

$$\frac{dF}{d\overrightarrow{R_{at,}}},$$

the derivative of the function with respect to the factor of the atomic ratios means that the system of equations is derived separately for each individual vector element. The result can be formulated most elegantly in matrix notation.

The formation of the derivatives can be carried out exactly in a few cases (if the system of equations consists only of polynomials, for example), but in the general case numerically or by using approximation values. Because of the generality of the approach, an arbitrary numerical method is recommended.

One expedient method is for a slope vector to be calculated for each vector element in accordance with the following formula:

$$\frac{\overrightarrow{\delta F}}{\delta R_{at,j}} = \frac{F(\overrightarrow{R_{mol}}, \overrightarrow{R_{at,i=j}}, [R_{at,j}(1+\delta)]) - F(\overrightarrow{R_{mol}}, \overrightarrow{R_{at,i=j}}, [R_{at,j}(1-\delta)])}{2\delta R_{at,j}}, j = 1, 2, 3 \ldots$$

As can be seen immediately, the linearized form of the equation can also be written in matrix notation (what is known as the Jacobi matrix).

This linearized equation can be solved in accordance with the known Gauss algorithm; the solution is taken as an initial vector for the next iteration step.

If appropriate, it is possible to continue to use the derivative determined at first in the following iteration steps; the iteration proceeds faster if the derivative is determined anew each time.

Since this method then generally converges at least at the square of the convergence speed, for example 5 iteration steps are often adequate; however, a threshold value for the change between two successive iterations steps is worth recommending as a stop criterion for the convergence.

3. Inverse Ion Correction

One important advantage of the method according to the invention resides in the fact that, for the "inverse" ion correction (the calculation of the molecular ratios with given atomic ratios, necessary for the standardization), the same system of equations and the same algorithm as for the ion correction can be used. The system of equations merely has to be solved for the molecular ratios, not for the atomic ratios as in the case of the ion correction.

For the inverse ion correction, the number of equations is typically, but not necessarily, higher than the number of variables. In this case, one line which consists only of zeros is obtained in the matrix $$\frac{dF}{d\overrightarrow{R_{at,}}}.$$

This line is then left out for the following calculations (see example).

III. Exemplary Calculation

In the following text, by using practical numerical values, the conventional and the new method are compared in exemplary calculations.

1. Conventional Method (Using the Example of $CO_2$)

The system of equations for $CO_2$, using the parameters K and λ from J. Sandrock, A. Studley, J. M. Hayes, Anal. Chem 1985 (57), 1444–1448, is:

$0 = R13 + 2*R17 - R45$ $0 = 2*R18 + 2*R13*R17 + R17^2 - R46$ $0 = K*R18^\lambda - R17$ with $K=0.0099235$ and $\lambda=0.516$ Inverse Ion Correction The usual primary standard is VPDB ("Vienna PDB": PDB for Pee Dee Belemite, a fossil found at the Pee Dee River; since this has recently no longer been available, the standard is now defined by the IAEA in Vienna (therefore "Vienna")); for the $CO_2$ generated from this, the following atomic ratios can be applied:

$R13_{st} = 0.0112372$ $R17_{st} = 0.000410850$ $R18_{st} = 0.002088349$

Substitution in the equations $R45_{std} = R13_{std} + 2*R17_{std}$ $R46_{std} = 2*R18_{std} + 2*R13_{std}*R17_{sdt} + R17_{std}^2$ yields $R45_{st} = 0.0120589$ $R46_{st} = 0.0041861$ Ion Correction The starting point, as in the new method explained below, will be molecular ratios which are 10 parts per thousand above those of the standard, that is to say $R45_{sa}=0.012179489$ $R46_{sa}=0.4227961409e-2$ For the ion correction, the system of equations must be transformed for this specific case; it follows that $0=-0.00029542755675(R18)^{1032}+20.0099235\ R45\ R18^{0.516}+2\ R18-R46$ with only one unknown; this is solved numerically for R18, for example, in accordance with a Newton-Raphson algorithm. The individual steps in this algorithm will not be discussed here, since this is known in the prior art.

The result for R18 is R18=0.0021092068

R13 also results from the transformed system of equations, specifically as $R13=R45-0.019847*R18^{0.516}$ that is to say R13=0.001135356448

2. New Method (Using the Example of $CO_2$)

In the case of $CO_2$, according to the general approach:
$A^1=C$; $A^2=O$
$n^1=1$; $n^2=2$
$m^1=12$; $m^2=16$ and thus, from the general system of equations explained above $0=1*R(12+1)+2*R(16+1)-R(1+12+2*16)$ $0=1*R(12+2)+2*R(16+2)+1*R(12+1)*(2*R(17))+0*R(12+1)^2+1*R(17+1)^2-R(2+12+2*16)$ From this, it then follows that $0=R13+2*R17-R45$ $0=2*R18+2*R13*R17+R17^2-R46$ The third equation needed to solve this system of equations with two unknowns is taken from the literature, specifically $0 = K*R18^\lambda - R17$ with $K = 0.0099235$ and $\lambda = 0.516$ These three equations and the atomic ratios for the standard are all that is needed.

Here, too, it will be assumed that the standard gas contains the same isotope ratios as the gas generated from VPDB $R13_{st}=0.0112372$ $R17_{st}=0.000410850$ $R18_{st}=0.002088349$ Inverse Ion Correction By using this, first of all the molecular ratios for the standard are calculated. Since there are 3 independent equations but only 2 unknowns, the system of equations is even over-defined.

The atomic ratios of the standard are known, the molecular ratios have to be calculated by means of linearisation.

As mentioned, the system of equations is $0=R13+2*R17-R45$ $0=2*R18+2*R13*R17+R17^2-R46$ $0=K*R18^\lambda-R17$ with $K=0.0099235$ and $\lambda=0.516$ or $0=0.0112372+2*0.000410850-R45$ $0=2*0.002088349+2*0.0112372*0.000410850+0.000410850^2-R46$ $0=0.516*R18^{0.0099235}-R17$ These equations are differentiated numerically in accordance with the above scheme with respect to an initial vector of the molecular ratios. As the initial vector of the molecular ratio, it is recommended to derive this from that from the atomic ratios $R45_0=R13_{st}=0.0112372$ $R46_0=2*R18_{st}=0.004176698$ δ is assumed to be 1e-3 in this example.

As an example, differentiate the first equation with respect to R45

$$\frac{\delta \vec{F}}{\delta R45} = \begin{pmatrix} \frac{.8329372e-3 - .8104628e-3}{.224744e-7} \\ \frac{0-0}{.224744e-7} \\ \frac{0-0}{.224744e-7} \end{pmatrix} = \begin{pmatrix} 1 \\ 0 \\ 0 \end{pmatrix}$$

Differentiation with respect to R46 is carried out in an analogous way, the linearized form of the system of equations is then (in matrix form)

$$\begin{pmatrix} -1 & 0 \\ 0 & -1 \\ 0 & 0 \end{pmatrix} * \left[ \begin{pmatrix} R45_{st} \\ R46_{st} \end{pmatrix} - \begin{pmatrix} 0.0112372 \\ 0.004176698 \end{pmatrix} \right] + \begin{pmatrix} 0.0008217 \\ 0.00219756484465 \end{pmatrix} = \begin{pmatrix} 0 \\ 0 \end{pmatrix}$$

The third line of the matrix consists only of the zeros, and is therefore left out:

$$\begin{pmatrix} -1 & 0 \\ 0 & -1 \end{pmatrix} * \left[ \begin{pmatrix} R45_{st} \\ R46_{st} \end{pmatrix} - \begin{pmatrix} 0.0112372 \\ 0.004176698 \end{pmatrix} \right] + \begin{pmatrix} 0.0008217 \\ 0.00219756484465 \end{pmatrix} = \begin{pmatrix} 0 \\ 0 \end{pmatrix}$$

If this is solved in accordance with the Gauss algorithm, it follows that $R45_{st}=0.0120589$ $R46_{st}=0.4186100405e-2$ Since the original system of equations is already strictly linear with respect to R45 and R46, the final result already follows in the first iteration step.

Ion Correction

According to a measurement listed by way of example, the measured molecular ratios are to be in each case 10 parts per thousand higher than the standard values, that is to say $R45_{sa}=0.012179489$ $R46_{sa}=0.4227961409e-2$ Using the initial values (here, as recommended above, the values known from the standard are used)

$R13_{sa,0}=0.0112372$ $R17_{sa,0}=0.000410850$ $R18_{sa,0}=0.002088349$

The form of the system of equations linearized in accordance with the above rule is $$\begin{pmatrix} 1 & 2 & 0 \\ 0.0008217 & .2329610e-1 & 2 \\ 0 & -1 & .1015149221 \end{pmatrix} * \left[ \begin{pmatrix} 0.0112372 \\ 0.000410850 \\ 0.002088349 \end{pmatrix} - \begin{pmatrix} R13 \\ R17 \\ R18 \end{pmatrix} \right] + \begin{pmatrix} .120589e-3 \\ .4186100404e-4 \\ .271e-10 \end{pmatrix} = \begin{pmatrix} 0 \\ 0 \\ 0 \end{pmatrix}$$

The factor 0.271e-10 is different from zero only because of rounding errors.

Using this, the result of the first iteration is $R13=0.1135355425e-1$, $R17=0.4129673746e-3$, $R18=0.2109207035e-2$ Of the further iterations, only the final results are reproduced here:

2nd Iteration $R13=0.1135356448e-1$, $R17=0.4129622625e-3$, $R18=0.2109206842e-2$ 3rd Iteration $R13=0.1135356448e-1$, $R17=0.4129622624e-3$, $R18=0.2109206842e-2$ Even after 3 iterations, in this example the final value has been reached within the context of the computing accuracy used here for R13 and R18 (no longer any changes between the last two iteration steps).

What is claimed is:

1. A method for determining atomic isotope masses in mass spectrometry, in which atomic isotope ratios are determined from molecular isotope ratios measured by means of an isotope mass spectrometer—ion correction, the determination of the atomic isotope ratios being carried out by the steps of:
   a) setting up and solving a system of equations which describes relationships between the atomic isotope ratios and the molecular isotope ratios, wherein the system of equations have at least as many independent equations as there are atomic isotope ratios
   b) linearizing the entire system of equations by means of suitable numerical methods in a first step; and
   c) subsequently solving the linearized system of equations as a whole without transforming the individual equations.

2. The method as claimed in claim 1, wherein, in order to standardize the measurements, molecular ratios are determined from standard values of atomic ratios—inverse ion correction, the same linearized system of equations being used both for the inverse ion correction and for the ion correction.

3. The method as claimed in claim 1, wherein the system of equations before the linearization is of the form $F(\vec{R}_{mol},\vec{R}_{at,})=0$.

4. The method as claimed in claim 1, wherein, for the determination of the iron correction, the linearization of the system of equations is carried out with the effect of a Taylor expansion with respect to an initial vector $R_{at}^0$.

5. The method as claimed in claim 1, wherein, for the purpose of fast convergence of the method, the known atomic ratios of the standard are used as the initial vector $R_{at}^0$.

6. The method as claimed in claim 2, wherein, for the purpose of fast convergence of the method, the known atomic ratios of the standard are used as the initial vector $R_{at}^0$.

7. The method as claimed in claim 3, wherein, for the purpose of fast convergence of the method, the known atomic ratios of the standard are used as the initial vector $R_{at}^0$.

8. The method as claimed in claim 4, wherein, for the purpose of fast convergence of the method, the known atomic ratios of the standard are used as the initial vector $R_{at}^0$.

9. The method as claimed in claim 4, wherein the expansion with respect to the initial vector $R_{at}^0$ is of the form:

$$F\left(\vec{R}_{moi},\vec{R}_{at,}\right) \approx \frac{dF}{d\vec{R}_{at,}} * \left(\vec{R}_{at,} - \vec{R}_{at}^0\right) F\left(\vec{R}_{moi},\vec{R}_{at}^0\right).$$

10. The method as claimed in claim 9, wherein, the slope vector $$\frac{dF}{d\vec{R}_{at,}}$$

is determined from $$\frac{\delta \vec{F}}{\delta R_{at,j}} = \frac{F\left(\vec{R}_{mol},\vec{R}_{at,i=j,},[R_{at,j}(1+\delta)]\right) - F\left(\vec{R}_{mol},\vec{R}_{at,i=j,},[R_{at,j}(1-\delta)]\right)}{2\delta R_{at,j}}, j=1,2,3\ldots$$

11. The method as claimed in claim 1, wherein the linearized form of the equation in matrix notation is solved in accordance with the Gauss algorithm.

12. The method as claimed in claim 4, wherein the linearized form of the equation in matrix notation is solved in accordance with the Gauss algorithm.

13. The method as claimed in claim 9, wherein the linearized form of the equation in matrix notation is solved in accordance with the Gauss algorithm.

14. The method as claimed in claim 10, wherein the solution of the slope vector is used as initial vector for a further iteration step.

15. An apparatus for determining atomic isotope masses in a mass spectrometer, having an input interface, a computing unit and an output interface, wherein:
   data about molecular isotope ratios which can be measured by means of an isotope mass spectrometer is transmitted to the computing unit via the input interface,
   atomic isotope ratios are determined from the data about molecular isotope ratios in accordance with a method for determining atomic isotope masses in mass spectrometry, atomic isotope ratios are determined from molecular isotope ratios measured by means of an isotope mass spectrometer—ion correction, the determination of the atomic isotope ratios being carried out by setting up and solving a system of equations which describes relationships between the atomic isotope ratios and the molecular isotope ratios, and the system of equations having to have at least as many independent equations as there are atomic isotope ratios, wherein the entire system of equations is linearized by means of suitable numerical methods in a first step and in which the linearized system of equations is subsequently solved as a whole without transforming the individual equations, and
   the atomic isotope ratios are output via the output interface.

16. The apparatus as claimed in claim 15, wherein, for the determination of the iron correction, the linearization of the system of equations is carried out with the effect of a Taylor expansion with respect to an initial vector $R_{at}^0$.

17. The apparatus as claimed in claim 16, wherein the expansion with respect to the initial vector $R_{at}^0$ is of the form:

$$F(\overrightarrow{R_{moi}}, \overrightarrow{R_{at,}}) \approx \frac{dF}{d\overrightarrow{R_{at,}}} * (\overrightarrow{R_{at,}} - \overrightarrow{R_{at}^0}) F(\overrightarrow{R_{moi}}, \overrightarrow{R_{at}^0}).$$

18. A computer program embodied on one or more computer readable media for controlling a computer to determine atomic isotope masses in mass spectrometry the computer program comprising:
   program code for setting up and solving a system of equations which describes relationships between atomic isotopes ratios and molecular isotope ratios, and the system of equations has to have at least as many independent equations as there are atomic ratios;
   program code for linearizing the entire system of equations by means of suitable numerical methods in a first step
   program code for solving the linearized system of equations as a whole without transforming the individual equations; thereby producing a result determining atomic isotope masses in mass spectrometry,
   wherein atomic isotope ratios are determined from molecular isotope ratios measured by means of an isotope mass spectrometer.

19. The computer program as claimed in claim 18, wherein, for the determination of the iron correction, the linearization of the system of equations is carried out with the effect of a Taylor expansion with respect to an initial vector $R_{at}^0$.

20. The computer program as claimed in claim 19, wherein the expansion with respect to the initial vector $R^{at0}$ is of the form:

$$F(\overrightarrow{R_{moi}}, \overrightarrow{R_{at,}}) \approx \frac{dF}{d\overrightarrow{R_{at,}}} * (\overrightarrow{R_{at,}} - \overrightarrow{R_{at}^0}) F(\overrightarrow{R_{moi}}, \overrightarrow{R_{at}^0}).$$

21. The method as claimed in claim 3, wherein the system of equations before the linearization is of the form:

$$0 = \sum_{i=1}^{imax} n_i R(m^i + 1) - R\left(1 + \sum_{i=1}^{imax} n_i m^i\right)$$

$$0 = \sum_{i=1}^{imax} n_i R(m^i + 2) + \sum_{i=1}^{imax} n_i R(m^i + 1) \sum_{j=i}^{imax} nj R(m^j + 1) +$$

$$\sum_{i=1}^{imax} Pos(n_i - 1) R(m^i + 1)^2 - R\left(2 + \sum_{i=1}^{imax} n_i m^i\right)$$

$$0 = \sum_{i=1}^{imax} n_i R(m^i + 3) + \sum_{i=1}^{imax} n_i R(m^i + 2) \sum_{j=i}^{imax} nj R(m^j + 1) +$$

$$\sum_{i=1}^{imax} n_i R(m^i + 1) \left(\sum_{j=i}^{imax} nj R(m^j + 1) \sum_{k=j}^{imax} nj R(m^j + 1)\right) +$$

$$\sum_{i=1}^{imax} Pos(n_i - 1) R(m^i + 1)^2 \sum_{j=1}^{imax} n_j R(m^j + 1) +$$

$$\sum_{i=1}^{imax} Pos(n_i - 2) R(m^i + 1)^3 - R\left(3 + \sum_{i=1}^{imax} n_i m^i\right)$$

$$0 = \ldots$$

22. The method as claimed in claim 1, wherein the entire system of equations is linearized by means of a Taylor expansion or similar method.

23. The apparatus as claimed in claim 15, wherein the entire system of equations is linearized by means of a Taylor expansion or similar method.

* * * * *